United States Patent Office 3,351,625
Patented Nov. 7, 1967

3,351,625
CERTAIN NORTROPANYL ETHERS OF DI-BENZO[a,d]-1,4-CYCLOHEPTADIENE
August F. Harms, Amsterdam, Netherlands, assignor to N.V. Koninklijke Pharmaceutische Fabrieken v/h Brocades Stheeman & Pharmacia, Meppel, Netherlands
No Drawing. Filed Feb. 12, 1964, Ser. No. 344,243
Claims priority, application Great Britain, Feb. 15, 1963, 6,348/63
3 Claims. (Cl. 260—292)

This invention relates to a new derivative of dibenzo-cyclo-heptane, to processes for its preparation, and to pharmaceutical preparations containing it. It is an improvement of the invention described and claimed in the specification of my copending U.S. application Serial No. 16,660 filed March 22, 1960, now Patent No. 3,119,829.

In the specification of Patent No. 3,119,829 there are described and claimed therapeutically active substances of the general formula:

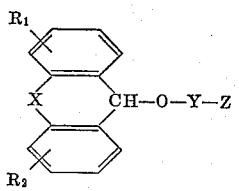

I wherein X is a —$CH_2$—$CH_2$— or —CH=CH— group, and $R_1$ and $R_2$ are the same or different and represent hydrogen, halogen, or alkyl groups having at most 4 carbon atoms, Y represents a straight or branched hydrocarbon chain with at most 6 carbon atoms, which may be interrupted by an oxygen atom, and Z represents a dialkylamino group in which one or both alkyl groups together with the nitrogen atom and, if desired, the carbon chain Y, may form one or more hetero-cyclic rings in which, in addition to this nitrogen atom, a second hetero atom may also be present, and their acid addition salts and quaternary ammonium compounds. In the aforesaid specification it is mentioned that the compounds of Formula I are useful as antihistaminics and, moreover, have a very strong anti-acetylcholine activity.

It has now been found after further research and experimentation that a compound related in structure to those of the aforementioned formula, i.e. the compound wherein X represents a —$CH_2$—$CH_2$— group, $R_1$ and $R_2$ are hydrogen atoms, and Y—Z represents a nortrop-3-yl group, also possesses useful therapeutic utility.

The present invention accordingly provides the hitherto unknown compound 3-(dibenzo[a,d]-1,4-cycloheptadien-5-yloxy)nortropane of the planar formula:

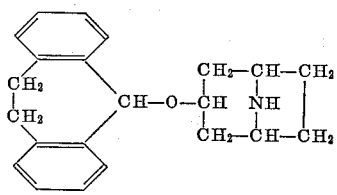

II and acid addition salts thereof. The compound of Formula II possesses pharmacological properties which are useful in therapeutic applications; in particular, it exerts a strong atropine-like action, decreasing locomotor activity. The compound may, moreover, be utilized as an intermediate in the production of other therapeutically active compounds, wherein the hydrogen atom on the nitrogen atom of the nortropane nucleus is replaced by groups such as an alkyl radical.

The compound of Formula II may be prepared by reacting nortropine with a dibenzo(a,d) - 1,4 - cyclo-heptadien-5-yl halide. The etherification reaction is preferably carried out by heating the reactants in an inert, anhydrous organic solvent, such as benzene, toluene or xylene, advantageously containing a tertiary amine (preferably a tri(lower)alkylamine, e.g. tributylamine) or other suitable acid-binding substance. A modification of this method comprises reacting dibenzo(a,d)-1,4-cycloheptadien-5-yl halide with an alkali metal salt such as the sodium or potassium salt of nortropine.

The compound of Formula II may also be prepared by de-methylating 3-(dibenzo[a,d]-1,4-cycloheptadien-5-yloxy)tropane by methods known per se for the de-methylation of methylamino compounds. The de-methylation may be effected, for example, by replacement of the methyl group with a cyano group through treatment of the tropane derivative with a cyanogen halide (preferably cyanogen bromide), then hydrolysis of the resultant N-cyano nortropane compound followed by decarboxylation of the N-carboxy nortropane compound thus formed.

Acid addition salts of 3-(dibenzo[a,d]-1,4-cycloheptadien-5-yloxy)nortropane may be obtained in manner known per se. Thus, the salts are obtainable by treatment of the base in an appropriate solvent medium, e.g. diethyl ether, with an equivalent quantity of an acid.

The term "methods known per se" as used in this specification means methods heretofore used or described in the literature.

The compound of the invention when used for therapeutic purposes may be employed as such or in the form of a non-toxic acid addition salt, i.e. a salt which is not harmful to the animal organism when used in therapeutic doses, derived from an inorganic acid, such as the hydrohalic acids (e.g. hydrochloric and hydrobromic acids), or an organic acid such as oxalic, maleic, fumaric, citric and tartaric acids.

The following examples, in which the temperature mentioned are in degrees centigrade, are given for purposes illustrating the invention and are not to be construed as limitations of this invention, many variations of which are possible within the scope and spirit thereof.

EXAMPLE I

A mixture of 6 g. of nortropine, 23.6 g. of dibenzo (a,d)-1,4-cycloheptadien-5-yl chloride and 8.9 g. of tributylamine, dissolved in 175 ml. of anhydrous toluene is heated under reflux for a period of 6 hours. The mixture is left standing overnight and then the toluene is distilled off under reduced pressure and 250 ml. of acetone and 300 ml. of petroleum ether (boiling range 28–40°) is added to the cooled residue. The hydrochloride of 3-(dibenzo[a,d] - 1,4-cycloheptadien-5-yloxy)-nortropane is filtered off and washed with a small portion of cold acetone.

The melting point of the crude product (yield 7.6 g.) is 185–187° C. The melting point can be raised to 192–194° C. by crystallization from propanol.

EXAMPLE II (a) *Preparation of 3-(dibenzo[a,d]-1,4-cyclo-heptadien-5-yloxy)tropano nitrile*

To 11.66 g. of cyanogen bromide in 100 ml. of benzene, a solution of 33.0 g. of 3-(dibenzo[a,d]-1,4-cycloheptadien-5-yloxy)tropane (prepared as described in U.S. Patent No. 3,119,829) in 100 ml. of anhydrous benzene is added gradually with stirring. The temperature rises slightly. The mixture is refluxed for three hours. After cooling the mixture is treated with water. The benzene layer is separated, and dried with sodium sulphate. After filtration and removal by distillation of the solvent, an oil is obtained. Treatment of the oil with alcohol yields 14 g. of 3-(dibenzo-[a,d]-1,4-cycloheptadien-5-yloxy)tropano nitrile, melting at 152–155° C. Recrystallisation from alcohol yields 12.5 g. of substance melting at 158–160° C.

*Analysis.*—Calculated for $C_{23}H_{24}N_2O$: C, 80.19%; H, 7.02%; N, 8.13%. Found: C, 80.59%; H, 6.96%; N, 8.14%.

(b) *Preparation of 3-(dibenzo[a,d]-1,4-cycloheptadien-5-yloxy-nortropane maleinate*

To 9.7 g. of 3-dibenzo[a,d]-1,4-cycloheptadien-5-yloxy)tropano-nitrile are added 24.0 g. of potassium hydroxide in 12 ml. of water and 48 ml. of alcohol. The mixture is refluxed for about 20 hours. It is then poured out in water and extracted with ether. The layers are separated and the ether layer is dried and, after filtration, the nortropane product is converted into the maleinate salt to yield 11.3 g. (92%) of 3-dibenzo[a,d]-1,4-cycloheptadien-5-yloxy)nortropane maleinate, melting at 184.5–186° after crystallisation from alcohol.

*Analysis.*—Calculated for $C_{26}H_{29}NO_5$: C, 71.70%; H, 6.71%; N, 3.22%. Found: C, 71.92%; H, 6.59%; N, 3.52%.

The invention includes within its scope pharmaceutical preparations containing 3-dibenzo[a,d]-1,4-cycloheptadien-5-yloxy)nortropane, or non-toxic acid addition salt thereof, in association with a pharmacologically acceptable carrier. The preparation may take any of the forms customarily employed for administration of therapeutically active substances, but the preferred types are those suitable for oral administration and especially tablets, pills, and capsules, including the substance. The tablets and pills may be formulated in manner known per se with one or more pharmacologically acceptable diluents or excipients, such as lactose or starch, and include materials of a lubricating nature such as magnesium or calcium stearate, and colouring substances. Capsules made of absorbable material, such as gelatine, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base. The active substance may also be made up in a form suitable for parenteral administration, i.e. as a suspension or emulsion in sterile water or an organic liquid usually employed for injectable preparations, for example a vegetable oil, such as olive oil or a sterile solution in an organic solvent.

The following example illustrates pharmaceutical preparations according to the invention.

EXAMPLE III

*Preparation of tablets each containing 1 mg. of 3-(dibenzo[a,d]-1,4-cycloheptadien-5-yloxy)nortropane*

From

| | Kg. |
|---|---|
| 3-dibenzo[a,d] - 1,4-cycloheptadien-5-yloxy)nortropane citrate | 0.4 |
| Lactose | 30.6 |
| Potato starch | 8.19 |
| Disodium hydrogen phosphate.$2H_2O$ | 0.35 |
| Potassium dihydrogen phosphate | 0.06 |
| Magnesium stearate | 0.4 | and coloring substances

| | G. |
|---|---|
| Indigo Carmine C.I. 73,015 | 0.8 |
| Tartrazine C.I. 19,140 | 1.0 |
| Amaranth C.I. 16,185 | 1.2 | a total of 400,000 tablets are made according to conventional pharmaceutical practice.

What I claim and desire to secure by Letters Patent is:
1. A compound selected from the group consisting of 3-(dibenzo[a,d] - 1,4-cycloheptadien-5-yloxy)nortropane, and a non-toxic acid addition salt thereof.
2. 3-dibenzo[a,d] - 1,4-cycloheptadien-5-yloxy)nortropane.
3. A non-toxic acid addition salt of 3-dibenzo[a,d]-1,4-cycloheptadien-5-yloxy)nortropane.

References Cited

UNITED STATES PATENTS 3,119,829   1/1964   Harms _____ 260—292

FOREIGN PATENTS 96,386   11/1960   Netherlands.

OTHER REFERENCES

Vander Stelt, J. Med. Pharm. Chem., vol. 4, No. 2 (1961), pp. 346–349.

Noller, Chemistry of Organic Compounds, 2nd ed., Saunders (1957), pp. 252, 253 and 549–550.

Migrdichian, Chem. Org. Cyanogen Cmpds., Reinhold (1947), p. 107.

WALTER A. MODANCE, *Primary Examiner.*

A. ROTMAN, *Assistant Examiner.*